US010963533B2

(12) United States Patent
Savinskiy et al.

(10) Patent No.: US 10,963,533 B2
(45) Date of Patent: Mar. 30, 2021

(54) EMBEDDED WEB PAGE ANALYTIC ELEMENTS

(71) Applicant: PayPal, Inc., San Jose, CA (US)

(72) Inventors: Anton Savinskiy, San Jose, CA (US); Sudhir Kumar Rama Rao, San Jose, CA (US); Muthukumar Sankaranarayanan, San Jose, CA (US); Jyothi Kiran Gurram, Fremont, CA (US); Krishna Bhargava Sharma, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 104 days.

(21) Appl. No.: 16/007,971

(22) Filed: Jun. 13, 2018

(65) Prior Publication Data

US 2018/0365335 A1 Dec. 20, 2018

Related U.S. Application Data

(60) Provisional application No. 62/519,118, filed on Jun. 13, 2017.

(51) Int. Cl.
*G06F 3/048* (2013.01)
*G06F 16/957* (2019.01)
*G06F 3/0481* (2013.01)
*G06F 16/954* (2019.01)
*G06F 16/955* (2019.01)

(52) U.S. Cl.
CPC ...... *G06F 16/9577* (2019.01); *G06F 3/04817* (2013.01); *G06F 16/954* (2019.01); *G06F 16/955* (2019.01); *G06F 16/957* (2019.01)

(58) Field of Classification Search
CPC ...... G06F 3/048; G06F 17/22; G06F 16/9577; G06F 16/957; G06F 16/954; G06F 16/955; G06F 3/04817
See application file for complete search history.

(56) References Cited

U.S. PATENT DOCUMENTS

| | | | | |
|---|---|---|---|---|
| 5,973,696 A | * | 10/1999 | Agranat | G06F 8/34 715/760 |
| 2004/0249650 A1 | * | 12/2004 | Freedman | G06Q 30/02 705/7.29 |
| 2013/0074042 A1 | * | 3/2013 | Engelbeck | G06F 11/3636 717/125 |
| 2015/0121192 A1 | * | 4/2015 | Kondepudi | G06F 16/957 715/234 |

* cited by examiner

*Primary Examiner* — Pei Yong Weng
(74) *Attorney, Agent, or Firm* — Haynes and Boone, LLP

(57) ABSTRACT

A web browser plugin or other software can be used to integrate visualization of analytical and/or debugging information related to a web page that is being viewed. Particular elements on the web page that are instrumented for tracking can be visually augmented, allowing a developer to see where and how certain aspects of web page functionality are being tracked and/or implemented. Certain information relating to the web page may be surfaced via a graphical area that is displayed concurrently with the web page, e.g., within the web browser that is being used to view the web page. The graphical area can also include selectable elements that can be used to launch additional queries into back-end services related to the web page. The present techniques allow for not only better and more convenient visualization of web page related data, but can speed up development time, reducing both computing and developer resources.

20 Claims, 6 Drawing Sheets

EMBEDDED WEB PAGE ANALYTIC ELEMENTS

RELATED CASES

This application claim priority to U.S. Provisional Patent Application 62/519,118, filed on Jun. 13, 2017, entitled "Embedded Web Page Analytic Elements," the contents of which are herein incorporated by reference in their entirety.

TECHNICAL FIELD

This disclosure relates, in various embodiments, to visually augmenting elements within a web page and techniques to provide improved visibility and access to web site data for development and/or debugging purposes.

BACKGROUND

Capturing and displaying statistics and debugging information relating to web page usage can be a cumbersome task. A back-end server might record information such as number of page hits, etc., or within one or more logs, but typically such information may need to be viewed separately from a web page that is being viewed. It may be difficult for a web software developer or other interested person to see particular information about a web page without opening a separate program, for example, perhaps even on a separate computing device. This can also make it difficult to verify whether particular portions of a web page are operating as intended (e.g. that statistics about all or some portion of the web page are being properly captured after updates or modifications to the web page have been made).

DETAILED DESCRIPTION

In order to visualize analytic and/or debugging data related to a web site, various information is often simply collected and stored in a separate data warehouse. Data relating to a particular web product (e.g. a service) may be collected in such a manner, for example.

From a software developer perspective, this approach is less than ideal. It can make it difficult to see usage statistics and other analytical and debugging information related to a web page. Instead, the present specification allows for an integrated approach that provides an advantage by allowing for quicker development and debugging by better visualizing important information related to a web page.

Separate visualizations can be built in order to understand the product usage and experience. Such visualizations may be done by separate software products. Such operations, however, may limit who has access to data and also can create siloed datamarts/dashboards (e.g. separate data stores that are not easily accessed or correlated together). Such an approach can limit the ability of web software developers to perform updates and modifications to a web site, and limit understanding of a product or service offered via the web site.

Thus, in various embodiments, augmented analytics for a web-based product are provided. This will democratize analytics data and make it self service in various embodiments. This can help decision makers to understand the customer experience within the product. It is also helpful in understanding the performance and user interaction via experimentation of features within the product. One can also intuitively whitelist themselves to the product experience. Democratizing analytics data to users with reasonable restrictions on who may see certain types of data like transactions, financial information, segmentation etc. can be achieved according to various embodiments.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
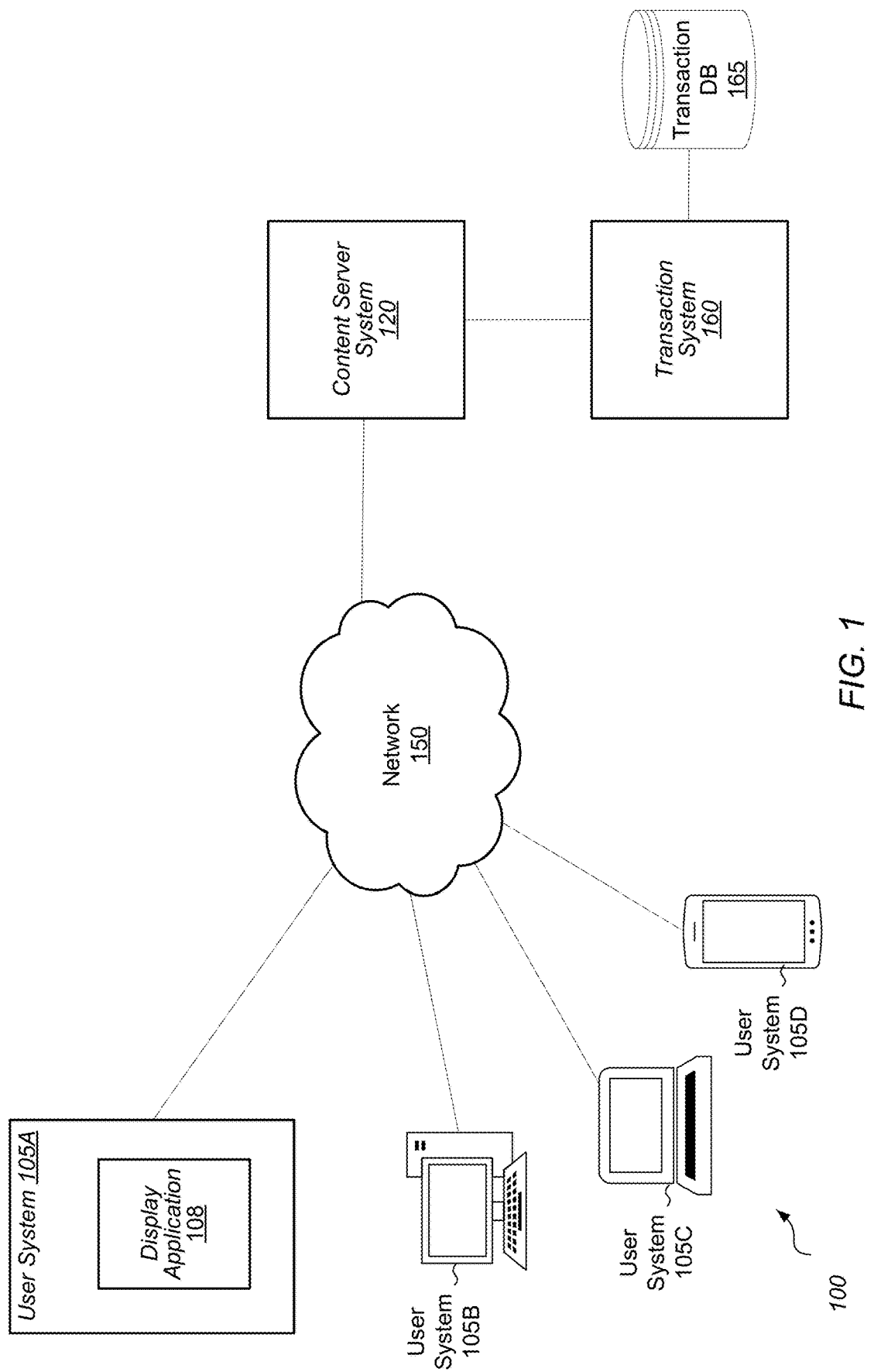
FIG. 1 illustrates a block diagram of a system that includes user systems, a content server system, a transaction system, and a network, according to some embodiments.

Turning to FIG. 1, a block diagram of a system 100 is shown. In this diagram, system 100 includes user systems 105A, 105B, 105C, and 105B, System 100 also includes content server system 120, transaction system 160, network 150, and transaction DB (database) 165. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

User system 105A may be any user computer system, and as shown, includes a display application 108 that is configured to display content to a user via a display device of user system 105A. Display application 108 may be a web browser, in some instances, or another program that displays web content. Other examples of user systems are also shown—user systems 105B, 105C, and 105D are respectively a desktop computer, laptop computer, and smartphone.

Content server system 120 may be any computing device configured to provide web content, in various embodiments. Services provided may include serving web pages (e.g. in response to a HTTP request) and/or providing an interface to transaction system 160 (e.g., a request to content server system 120 to perform a transaction may be routed to transaction system 160). Content server system 120 may comprise one or more computing devices each having a processor and a memory, as may transaction system 160. Network 150 may comprise all or a portion of the Internet.

Transaction system 160 may correspond to an electronic payment transaction service such as that provided by PayPal™. Transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via transaction system 160, including but not limited to stocks, commodities, gift cards, incentive points (e.g. from airlines or hotels), etc. Transaction system 160 may also correspond to a system providing functionalities such as API access, a file server, or another type of service with user accounts in some embodiments (and such services can also be provided via content server system 120 in various embodiments).

Transaction database (DB) 165 includes records related to various transactions taken by users of transaction system 160 in the embodiment shown. These records can include any number of details, such as any information related to a transaction or to an action taken by a user on a web page or an application installed on a computing device (e.g., the PayPal app on a smartphone). Many or all of the records in transaction database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details.

Figure 2A:
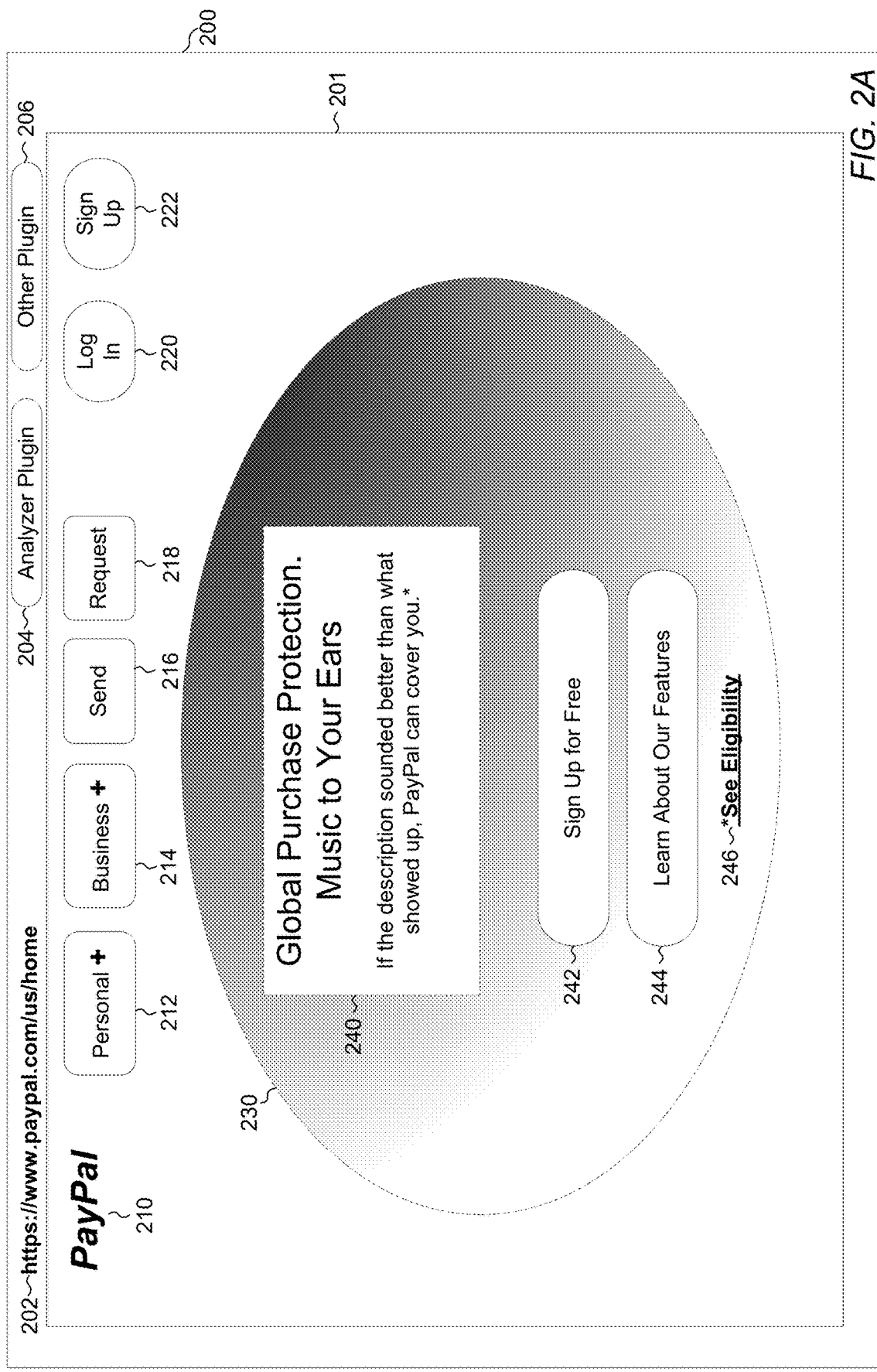
FIG. 2A illustrates a diagram relating to a web browser that is viewing a particular web page, according to some embodiments.

Turning to FIG. 2A, a diagram is shown relating to a web browser 200 that is viewing a particular web page 201 (in this case, https://www.paypal.com/us/home, as indicated by URL 202). Web browser 200 may include various installed browser plugin applications, such as analyzer plugin 204 (and/or additional plugins such as other plugin 206).

This figure illustrates various elements within web page 201. Elements 210, 212, 214, 216, 218, 220, and 222 are all selectable elements (for example, a user can click on them with a mouse, touchscreen, or other user input device). Clicking on these elements may cause one or more various actions to be taken—navigating to a different web page, opening a popup or dropdown menu, changing a visual appearance of web page 201, surfacing additional content on web page 201, etc. For example, selecting element 220 ("Log In") will take the user to a different login page that asks for an email address and user password. Elements 242, 244, 246 are similarly selectable elements. Such elements may be displayed to the user as a graphic (e.g. a button), a hyperlink, an interactive web form, or in other manners as well.

Elements 230 and 240 are non-selectable elements within web page 201. For example, element 230 comprises a background graphic that is shown on the web page, while element 240 includes text that is displayed to the user. Attempting to select element 230 or element 240 will not cause an action to be taken via web page 201, in this example. (This is not to say that non-selectable elements cannot be interacted with in any fashion—a user could mouse right-click on a graphic to save the still image to their desktop, for example, or highlight text by clicking on it.)

As well be explained below, certain portions of web page 201 are instrumented for statistical analysis and de-bugging, while other portions are not. The portions that have been instrumented for analysis can be visually modified, in various embodiments, when analyzer plugin 204 is launched by a user.

Figure 2B:
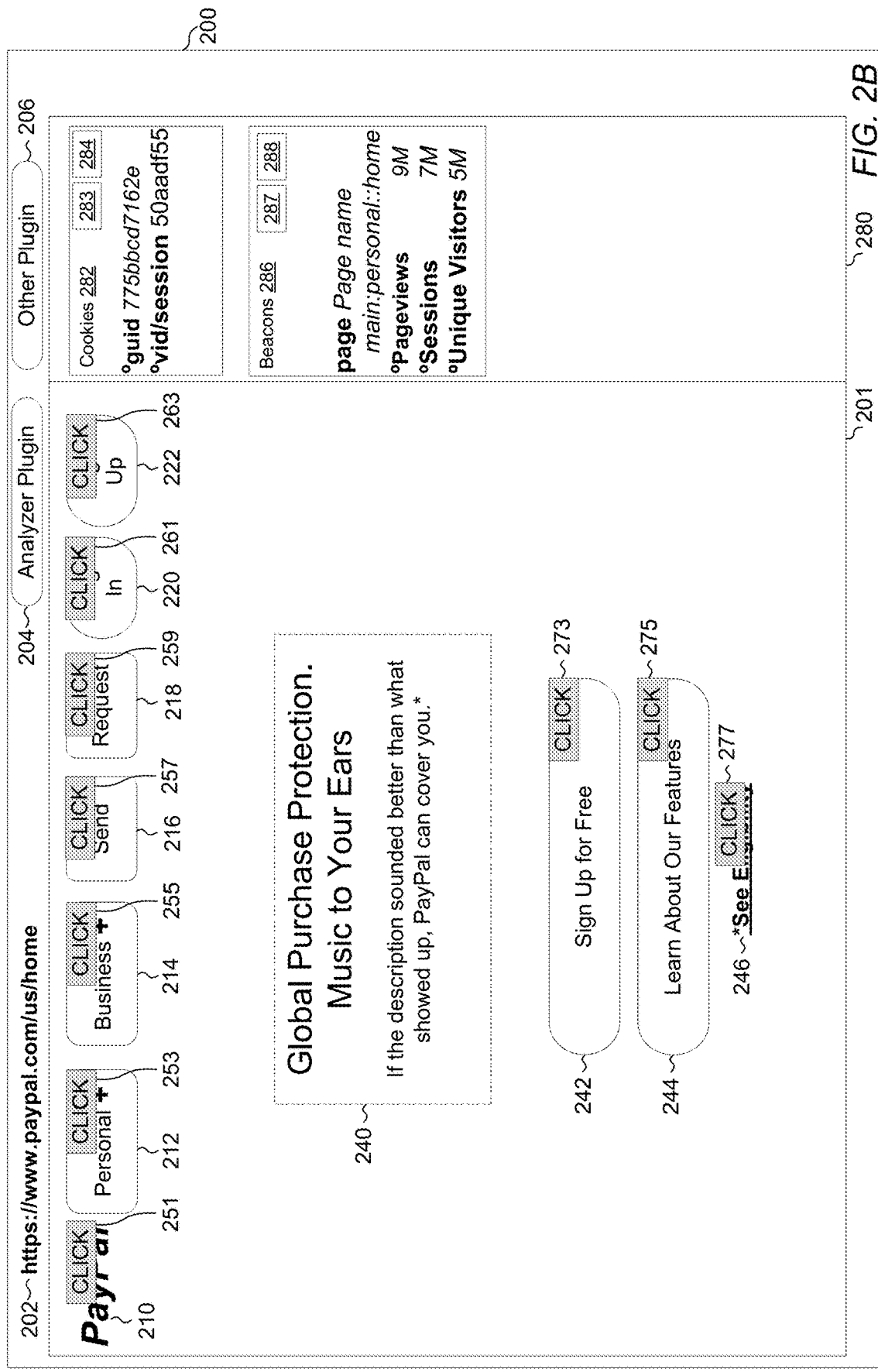
FIG. 2B illustrates a diagram further relating to a web browser after an analyzer plugin has been activated, according to some embodiments.

Turning to FIG. 2B, a diagram is shown relating to a web browser 200 that is viewing web page 201 after a user has activated analyzer plugin 204. In this figure, various elements of web page 201 have been visually augmented to indicate analytical and debugging functionality for those elements, as enabled through analyzer plugin 204.

In this figure, elements such as element 220 have had graphical icons overlaid on top of them. These graphical icons include icons 251, 253, 255, 257, 259, 261, 263, 273, 275, and 277. Each of these icons is associated with a respective interactive element (e.g., graphical icon 251 is associated with element 210, etc.). In this case, the graphical icons display the text "CLICK", indicating to a software develop or other user of analyzer plugin 204 that the associated elements can be clicked on by a user. Other graphical icons may be used for other types of elements (e.g., a form field may be labeled as "FORM" with a graphical icon, or "FORM-SUBMIT" if hitting the ENTER key on a keyboard will cause submission of an HTML form). Visual augmentation of interactive web page elements is not limited to the above examples—many different forms of augmentation are possible, as described further below relative to FIG. 3.

When analyzer plugin 204 is opened by a user, a graphical area 280 is opened immediately adjacent to web page 201. In various embodiments, this graphical area could be opened in a separate tab, or partially or fully overlapping with a view of web page 201, as desired. Note that in various embodiments, graphical area 280 is therefore opened within a same program (e.g. a web browser) that is being used to view a web page.

Graphical area 280, as shown, includes certain information about web page 201 and elements of web page 201. Graphical area 280 is an interactive visual area that includes, in various embodiments, a plurality of selectable visual elements, each usable to navigate to a different web page respectively providing different analytical information relating to web page 201. Graphical area 280 therefore, as explained below, can include links to external pages and services, as well as also including analytical, statistical, and/or debugging information in-line.

Graphical area 280, in this embodiment, includes cookies 282, which is a visual area that includes information regarding cookies used by web page 201, and beacons 286, which is a visual area that includes information regarding information beacons (e.g. parcels of information sent from user device 105A to content server system 120 and/or to another system, and/or from those systems back to user device 105A.

As shown, cookies 282 includes information on a guid (e.g. global user identification) cookie and another cookie titled vid/session (which may be a unique session cookie for example). Cookies 282 also includes selectable visual elements 283 and 284, which can be used to navigate a web browser to another web page (e.g. hosting another service) with additional information about web page 201. Note cookies 282 may have greater or fewer selectable visual elements such as 283 and 284 in various embodiments.

Beacons 286, as shown, includes information about the name of web page 281 (e.g. within a naming schema), as well as statistical information. This statistical information may be loaded into graphical area 280 by fetching it from one or more external back-end services, e.g., as may be maintained by content server system 120 or another system (thus, a plugin used to create graphical area 280 may make one or more requests to other systems prior to displaying graphical area 280 or after graphical area 280 has been displayed). Graphical area 280 may be dynamically updated with new information as a query is responded to. As will be appreciated, many different kinds of information may be displayed within graphical area 280, which is merely shown as one example of an interactive visual area that includes a plurality of selectable visual elements, each usable to navigate to a different web page respectively providing different analytical information relating to web page 201.

Figure 2C:
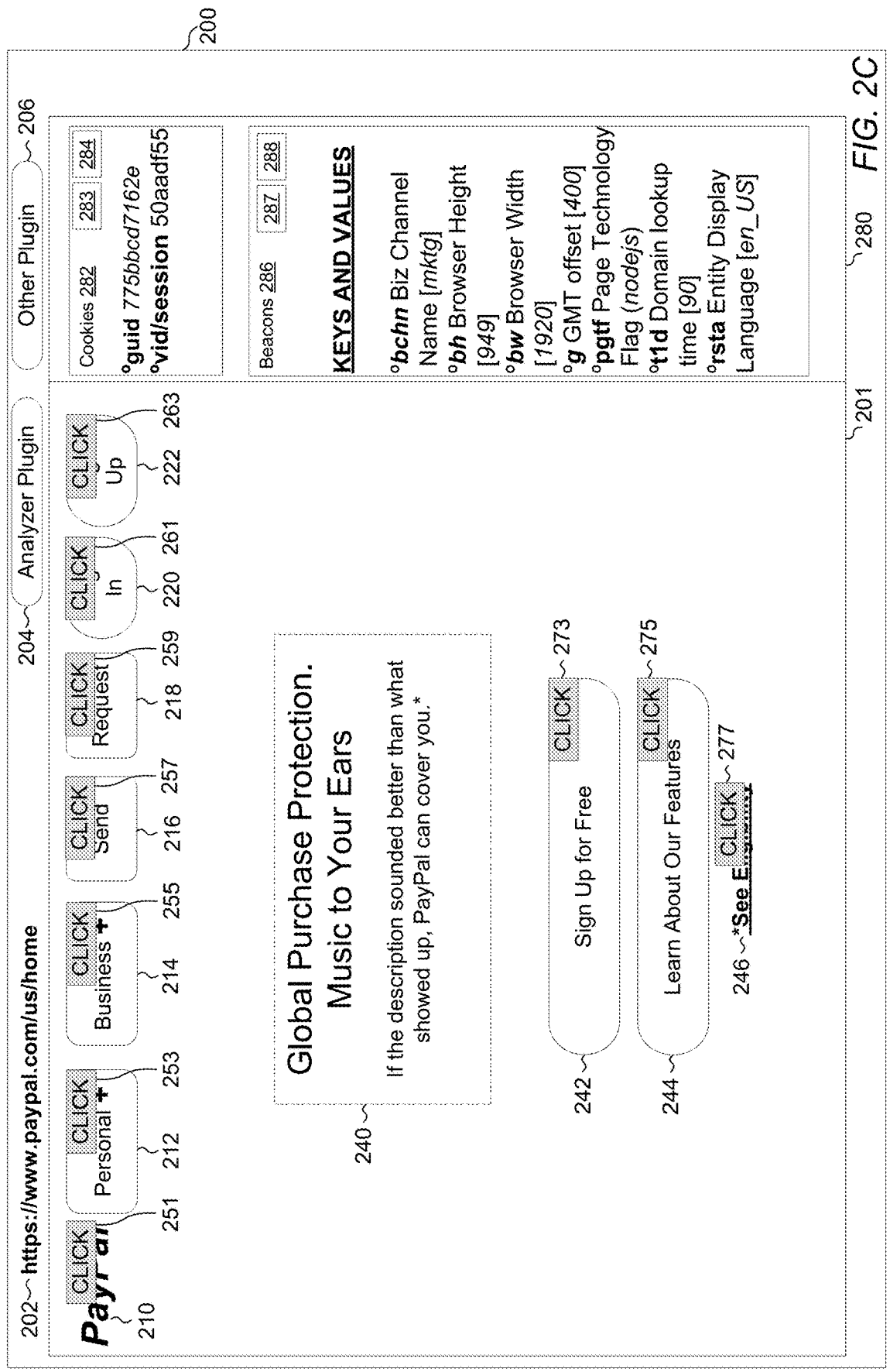
FIG. 2C illustrates a diagram further relating to a web browser after a particular element within the analyzer plugin has been selected, causing display of a plurality of keys within a particular graphical area.

Turning to FIG. 2C, a diagram is shown relating to a web browser 200 that is viewing web page 201 after a user has activated analyzer plugin 204 and then selected a particular element (e.g. element 288) to cause display of a plurality of keys within graphical area 280. These keys may each relate to one or more of a web browser used to view web page 201, a web site corresponding to web page 201, an internet domain used to serve web page 201 (such as PayPal.com for example), a graphical display setting of web page 201, or other information.

In this example, key "bchn" is for a business channel name having the value "mktg" (e.g. marketing). Keys "bh" and "bw" are respectively for browser height and browser width, having the respective values 949 (pixels) and 1920 (pixels). Key "g" is for a GMT time offset, having a value of 400. Key "pgtf" is for a page technology flag having the value "nodejs". Key "t1d" is a domain lookup time having the value 90 (milliseconds), while key "rsta" is for an entity display language having the value "en US" (e.g., United States English). These keys and values may be used for debugging and development purposes; for example, if a feature of web page 201 is not working correctly, a software developer can easily reference one or more of the key values to see if it may be affecting functionality. Many different keys and values may be shown; the ones displayed in FIG. 2C are merely examples.

Figure 3:
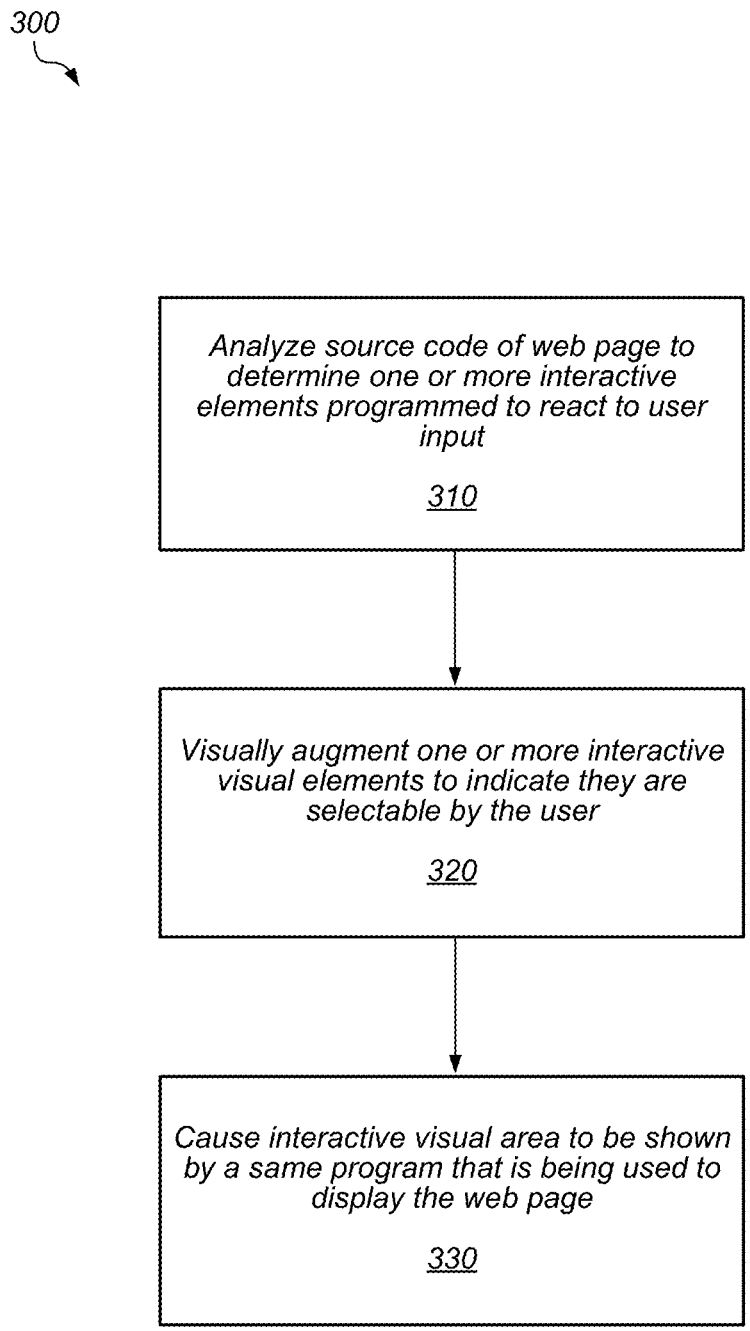
FIG. 3 illustrates a flow diagram of a method that relates to analyzing a web page and visually augmenting the web page in a manner that may be useful for software development and/or debugging purposes.

Turning to FIG. 3, a flowchart is shown of one embodiment of a method 300 relating to analyzing a web page and visually augmenting the web page in a manner that may be useful for software development and/or debugging purposes.

Operations described relative to FIG. 3 may be performed, in various embodiments, by any suitable computer system and/or combination of computer systems, including user system 105A. For convenience and ease of explanation, however, operations described below will simply be discussed relative to user system 105A rather than another system. Further, various elements of operations discussed below may be modified, omitted, and/or used in a different manner or different order than that indicated. Thus, in some embodiments, user system 105A may perform one or more aspects described below, while another system might perform one or more other aspects. Further, a web browser program may be used to perform all or a portion of the operations described.

In operation 310, user system 105A analyzes source code of a web page, according to various embodiments. This operation may include determining a group of one or more interactive elements that are each programmed to react to input by a user viewing the web page, with the one or more interactive elements being part of a plurality of elements of the web page.

Operation 310 can include a web browser (such as GOOGLE CHROME™, MICROSOFT EDGE™, etc.) loading a web page that is then analyzed from within the web browser. The analyzing, as well as other operations, can be performed by a plugin software application installed via the web browser (although in other embodiments, may be performed by software other than a plugin, including software otherwise integrated into the web browser in some cases). One advantage of using a plugin is that operations can be performed while a user is viewing a web page, which is both faster and provides better understanding than using a separate program, in various instances (e.g. a user can view analytical and augmentation information on or near the web page itself rather than having to use a separate program).

Analyzing the source code of a web page to determine a group of one or more interactive elements may include scanning the source code to locate one or more tags having particular values, and correlating the one or more tags to the one or more interactive elements. Thus, for example, a plugin application could parse through all or a portion of HTML source code of a web page, or through a document object model (DOM) of the rendered web page to find particular tags designating certain interactive elements. The tags may be implemented in any number of ways, but in one instance, particular attribute information may be included or associated with one or more web page elements. For example, element 210 from FIG. 2 (a PayPal graphical logo that can be clicked on) might include an HTML <IMG> tag. This tag in one embodiment might resemble '<IMG src="PayPal_Logo.jpg" track tag="ab54d8f013bace4" . . . > where the "track tag" attribute indicates this is an element that is being tracked, along with an associated unique attribute value. Multiple different web page elements may be determined during operation 410 as being interactive elements that will later be visually augmented (e.g. in operation 420). Correlating the tags to the particular interactive elements may be as simple as knowing that a web page element has In operation 320, user system 105A visually augments one or more interactive elements to indicate that those elements are selectable by the user, according to various embodiments. In one instance visually augmenting the one or more interactive elements includes placing a graphical icon in proximity to those elements. E.g., as shown in FIG. 2B, a graphical icon with the word "CLICK" (e.g. element 251) can be placed partially or wholly overlapping an interactive web page element. Such a graphical icon can also be placed nearby (e.g. not overlapping) the web page element, but within a certain distance such that its association with a particular web page element is visually obvious to a user (e.g. with a pre-set amount of pixels or some other distance measurement). The graphical icon can also be associated with the web page element in some other way (e.g. a visual reference connecting the icon to the web page element).

Visually augmenting one or more interactive elements (such as elements 212, 214, 216, etc.) can include dynamically updating a view of the web page on a display of a computer system without having to re-load the web page from a server. That is, the visual augmentation may be done entirely client-side, in various embodiments, and there is no need to make an additional server request. The visual augmentation can be done, for example, by directly modifying a document object model (DOM) and/or using JavaScript or other scripting language functionality.

Visually augmenting one or more interactive elements in operation 420 may also include altering an appearance of a particular interactive element by changing at least one of a size, a color, and/or a font of the particular interactive element. Thus, rather than overlaying a graphical icon on a web page element, the web page element could be visually modified in other ways (e.g., change the font text to bright red and make the font appear bold; draw a white 8-pixel wide border around the web page element, etc.).

In operation 430, user system 105A causes an interactive visual area to be shown by a same program that is being used to display the web page, according to various embodiments. This interactive visual area may include a plurality of selectable visual elements, each usable to navigate to a different web page respectively providing different analytical information relating to the web page.

An interactive visual area, such as graphical area 280, may be shown in response to a user launching a plugin application of a web browser, or in response to another user action, in various embodiments. Within the interactive visual area are two or more user selectable elements (such as a web hyperlink, forms, etc.) that can be used to launch a different web page that may provide a statistical, analytical, and/or debugging service. These services may be separate from the web page being viewed by the user (e.g. web page 201). Launching one of these separate services can include the plugin application constructing a request that is sent to a back-end system, such as content server system 120 (or another system). The separate service that is launched may be launched within a newly opened tab of web browser 200, for example, responsive to actions taken by analyzer plugin 204.

In one embodiment, the interactive visual area may include one or more key/data value pairs relating to the web page being viewed. For example, referring to FIG. 2B, element 288 can be selected to expand the view of a particular information beacon (as shown in FIG. 2C). This expansion may show many different pieces of information relevant to the web page. Further, in some embodiments, for each of the plurality of keys, at least one corresponding data value for that key can be displayed responsive to the user hovering a cursor on a particular visual area for that key. For example, while in FIG. 2C, key values are shown in brackets, these values may be hidden and only displayed when the user moves a mouse cursor over the key name (e.g., the value "1920" for browser width may be displayed to the user when their mouse cursor is hovered above the "bw" key).

In one embodiment, method 300 may include causing display of contents of one or more information beacons transmitted to a back-end statistics service responsive to one or more actions the user has taken on the web page. For example, when analyzer plugin 204 has been launched and a user takes an action such as submitting a form, clicking a button, etc., an additional beacon section similar to beacons 286 may be displayed within graphical area 280 showing information that was transmitted to content server system 120 (and/or another server system). Such a display of information may provide additional use in debugging and/or verifying correct functionality of a web page.

Computer-Readable Medium

Figure 4:
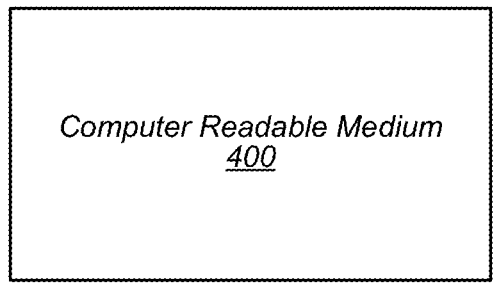
FIG. 4 is a diagram of a computer readable medium, according to some embodiments.
Figure 5:
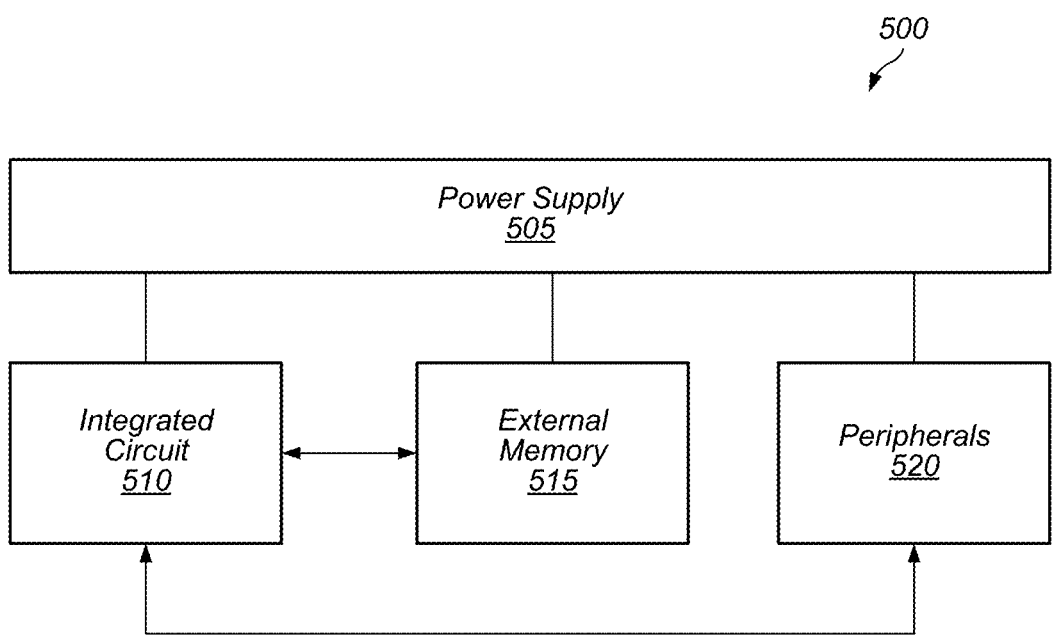
FIG. 5 is a block diagram of a system, according to some embodiments.

Turning to FIG. 5 a block diagram of one embodiment of a computer-readable medium 500 is shown. This computer-readable medium may store instructions corresponding to the operations of FIG. 4 and/or any techniques described herein. Thus, in one embodiment, instructions corresponding to processing system 120 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

In FIG. 4, one embodiment of a computer system 500 is illustrated. Various embodiments of this system may be included in user system 105A, content server system 120, or any other computer system.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as wifi, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices. By way of further explanation, in some embodiments system 500 may include multiple computers or computing nodes that are configured to communicate together (e.g. computing cluster, server pool, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
analyzing, by a computer system, source code of a web page to determine a group of one or more interactive elements that are each programmed to react to input by a user viewing the web page, the one or more interactive elements being part of a plurality of elements of the web page;
visually augmenting the one or more interactive elements to indicate that those elements are selectable by the user, wherein an additional server request is not required for performing the visual augmentation;
causing, by the computer system, an interactive visual area to be shown by a same program that is being used to display the web page, the interactive visual area including a plurality of selectable visual elements and a plurality of web cookies usable by the web page, one or more of which are usable to navigate to a different web page respectively providing different analytical information relating to the web page, each web cookie associated with one of the plurality of selectable visual elements and one of a user ID or a session ID;
querying a back-end system for statistical information associated with the web page; and
dynamically updating the plurality of selectable visual elements in the interactive visual area based on a response to the querying for the statistical information from the back-end system.

2. The method of claim 1, wherein the program used to display the web page is a web browser.

3. The method of claim 1, wherein the interactive visual area is displayed immediately adjacent to the web page.

4. The method of claim 1, wherein the interactive visual area includes a particular visual element selectable to cause a display, within the interactive visual area, of a plurality of keys and at least one corresponding data value for each key, wherein each of the plurality of keys relates to at least one of a web browser used to view the web page, a web site corresponding to the web page, an internet domain used to serve the web page, or a graphical display setting of the web page.

5. The method of claim 4, wherein for each of the plurality of keys, the at least one corresponding data value for that key is displayed responsive detecting a cursor hovering on a particular visual area for that key.

6. The method of claim 1, wherein a first of the plurality of selectable visual elements is usable to navigate to a particular web page including analytical information descriptive of a number of unique visitors to the web page within a particular time period.

7. The method of claim 1, wherein the interactive visual area includes one or more statistics associated with the statistical information on the web page being viewed by the user.

8. The method of claim 1, wherein analyzing the source code of the web page to determine the group of one or more interactive elements comprises scanning the source code to locate one or more tags having particular values, and correlating the one or more tags to the one or more interactive elements.

9. The method of claim 1, further comprising causing a display of content of one or more information beacons transmitted to the back-end system for statistics service responsive to one or more actions detected from the web page.

10. The method of claim 9, wherein the one or more actions include a loading of the web page or an interaction with an element on the web page via a user interface device of a user computing device.

11. A non-transitory computer-readable medium having stored thereon instructions that are executable by a computer system to cause the computer system to perform operations comprising:
analyzing source code of a web page to determine a group of one or more interactive elements that are each programmed to react to input by a user viewing the web page, the one or more interactive elements being part of a plurality of elements of the web page;
visually augmenting the one or more interactive elements to indicate that those elements are selectable by the user, wherein an additional server request is not required for performing the visual augmentation;
causing an interactive visual area to be shown, on a display of the computer system, by a same program that is being used to display the web page, the interactive visual area including one or more selectable visual elements and a plurality of web cookies usable by the web page, one or more of which are usable to navigate to a different web page respectively providing different analytical information relating to the web page, each web cookie associated with one of the plurality of selectable visual elements and one of a user ID or a session ID;

querying a back-end system for statistical information associated with the web page; and dynamically updating the plurality of selectable visual elements in the interactive visual area based on a response to the querying for the statistical information from the back-end system.

12. The non-transitory computer-readable medium of claim 11, wherein the operations further comprise:

detecting a user selection, within a web browser, of a particular one of the selectable visual elements; and in response to the detecting, causing a new tab within the web browser to open to a particular web application displaying analytical information relating to the web page.

13. The non-transitory computer-readable medium of claim 12, wherein causing the new tab to open includes sending a transmission to a server hosting the particular web application.

14. The non-transitory computer-readable medium of claim 11, wherein visually augmenting the one or more interactive elements comprises dynamically updating a view of the web page on the display of the computer system without the additional server request.

15. The non-transitory computer-readable medium of claim 11, wherein visually augmenting the one or more interactive elements comprises placing a graphical icon in proximity to a particular interactive element.

16. The non-transitory computer-readable medium of claim 15, wherein placing the graphical icon in proximity to the particular interactive element comprises overlaying the graphical icon at least partially on top of the particular interactive element or displaying the graphical icon within a pre-determined distance of the particular interactive element.

17. The non-transitory computer-readable medium of claim 11, wherein visually augmenting the one or more interactive elements comprises altering an appearance of a particular interactive element by changing at least one of a size, a color, and/or a font of the particular interactive element.

18. The non-transitory computer-readable medium of claim 11, wherein the instructions are executable as part of a web browser plugin application for a web browser of the computer system.

19. A computer system, comprising:

a processor;

a display; and a non-transitory computer-readable medium having stored thereon instructions that are executable by the processor to cause the computer system to perform operations comprising:

analyzing source code of a web page to determine a group of one or more interactive elements that are each programmed to react to input by a user viewing the web page, the one or more interactive elements being part of a plurality of elements of the web page;

visually augmenting the one or more interactive elements to indicate that those elements are selectable by the user, wherein an additional server request is not required for performing the visual augmentation;

causing an interactive visual area to be shown, on the display of the computer system, by a same program that is being used to display the web page, the interactive visual area including a plurality of selectable visual elements and a plurality of web cookies usable by the web page, one or more of which are usable to navigate to a different web page respectively providing different analytical information relating to the web page, each web cookie associated with one of the plurality of selectable visual elements and one of a user ID or a session ID;

querying a back-end system for statistical information associated with the web page; and dynamically updating the plurality of selectable visual elements in the interactive visual area based on a response to the querying for the statistical information from the back-end system.

20. The computer system of claim 19, wherein the interactive visual area includes a particular visual element selectable to cause a display, within the interactive visual area, of a plurality of keys and at least one corresponding data value for each key, wherein each of the plurality of keys relates to at least one of a web browser used to view the web page, a web site corresponding to the web page, an internet domain used to serve the web page, or a graphical display setting of the web page.

* * * * *